(12) United States Patent
Yamada et al.

(10) Patent No.: US 11,228,975 B2
(45) Date of Patent: Jan. 18, 2022

(54) SERVICE CONTROL APPARATUS, CHARGING MANAGEMENT SERVER, SERVICE CONTROL METHOD, CHARGING INFORMATION MANAGEMENT METHOD, AND COMPUTER READABLE MEDIUM

(71) Applicant: NEC Corporation, Tokyo (JP)

(72) Inventors: Toru Yamada, Tokyo (JP); Akira Kamei, Tokyo (JP); Yumiko Okuyama, Tokyo (JP); Kyoji Hirata, Tokyo (JP); Masahiro Serizawa, Tokyo (JP); Satoshi Hasegawa, Tokyo (JP); Masashi Shimoma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/647,587

(22) PCT Filed: May 10, 2018

(86) PCT No.: PCT/JP2018/018088
§ 371 (c)(1),
(2) Date: Mar. 16, 2020

(87) PCT Pub. No.: WO2019/058629
PCT Pub. Date: Mar. 28, 2019

(65) Prior Publication Data
US 2020/0236621 A1 Jul. 23, 2020

(30) Foreign Application Priority Data
Sep. 21, 2017 (JP) .............................. JP2017-181505

(51) Int. Cl.
*H04W 52/02* (2009.01)
*H04W 4/70* (2018.01)
(Continued)

(52) U.S. Cl.
CPC ......... *H04W 52/0216* (2013.01); *H04L 67/16* (2013.01); *H04M 15/66* (2013.01);
(Continued)

(58) Field of Classification Search
CPC ... H04W 52/0216; H04W 4/70; H04W 76/14; H04W 48/18; H04W 88/06; H04W 4/24;
(Continued)

(56) References Cited

U.S. PATENT DOCUMENTS

2019/0364492 A1* 11/2019 Azizi ................ H04W 52/0264

FOREIGN PATENT DOCUMENTS

JP 2013-172337 A 9/2013

OTHER PUBLICATIONS

International Search Report for PCT Application No. PCT/JP2018/018088, dated Jun. 26, 2018.
(Continued)

*Primary Examiner* — Diane D Mizrahi
(74) *Attorney, Agent, or Firm* — Sughrue Mion, PLLC

(57) ABSTRACT

A service control apparatus (20) according to the present disclosure includes: a communication unit (21) configured to receive a first communication pattern that defines a timing of communication between a service providing apparatus (30) and a communication terminal (10) from the service providing apparatus (30) and a second communication pattern that defines a timing of communication between a service providing apparatus (32) and the communication terminal (10) from the service providing apparatus (32); and a controller (22) configured to determine whether the first communication pattern and the second communication pattern indicate communication timings different from each other. When the first communication pattern and the second communication pattern indicate communication timings different from each other, the communication unit (21) trans-
(Continued)

mits a message to the second service providing apparatus (32) requesting it to change its communication pattern to the first communication pattern.

6 Claims, 7 Drawing Sheets

(51) Int. Cl.
      *H04W 76/14*     (2018.01)
      *H04L 29/08*     (2006.01)
      *H04M 15/00*     (2006.01)
      *H04W 48/18*     (2009.01)
      *H04W 88/06*     (2009.01)

(52) U.S. Cl.
      CPC ............. *H04W 4/70* (2018.02); *H04W 48/18* (2013.01); *H04W 76/14* (2018.02); *H04W 88/06* (2013.01)

(58) Field of Classification Search
      CPC ....... H04W 4/12; H04W 88/18; H04W 52/02; H04L 67/16; H04L 12/1407; H04M 15/66; H04M 15/83; H04M 15/85; H04M 15/61; H04M 15/58; H04M 11/00; Y02D 30/70; G08C 15/06
      See application file for complete search history.

(56) References Cited

OTHER PUBLICATIONS

3rd Generation Partnership Project; Technical Specification Group Services and System Aspects; Architecture enhancements to facilitate communications with packet data networks and applications (Release 15), 3GPP TS23.682 V15.1.0 (Jun. 2017),France.

3rd Generation Partnership Project; Technical Specification Group Services and System Aspects; Architecture enhancements to facilitate communications with packet data networks and applications (Release 14), 3GPP TS 23.682 V14.5.0, Sep. 18, 2017, France.

* cited by examiner

SERVICE CONTROL APPARATUS, CHARGING MANAGEMENT SERVER, SERVICE CONTROL METHOD, CHARGING INFORMATION MANAGEMENT METHOD, AND COMPUTER READABLE MEDIUM

This application is a National Stage Entry of PCT/JP2018/018088 filed on May 10, 2018, which claims priority from Japanese Patent Application 2017-181505 filed on Sep. 21, 2017, the contents of all of which are incorporated herein by reference, in their entirety.

TECHNICAL FIELD

The present disclosure relates to a service control apparatus, a charging management server, a service control method, a charging information management method, and a program.

BACKGROUND ART

In recent years, network configurations for achieving communications between a number of Machine Type Communication (MTC) terminals connected to a network and a server apparatus have been studied by the 3rd Generation Partnership Project (3GPP). Specifically, discussions regarding an interface between a Services Capability Server (SCS) and a Service Capability Exposure Function (SCEF) entity (hereinafter, this entity is referred to as an SCEF) have been taking place. The SCS is connected to a plurality of Application Servers (ASs). The SCEF is a node arranged in a mobile network. The SCS is used as a service platform that accommodates a plurality of ASs. The mobile network is a network formed of a node apparatus whose specification is defined by the 3GPP.

Non-Patent Literature 1 defines that a T8 Reference Point is provided as an interface between the SCS and the SCEF.

Non-Patent Literature 1 defines, for example, T8 Transaction Reference ID (TTRI), T8 Long Term Transaction Reference ID (TLTRI), T8 Destination Address, Accuracy, Idle Status Indication and the like as common parameters transmitted in the T8 Reference Point.

Non-Patent Literature 1 further discloses a procedure for specifying or configuring, when the SCS performs communication with a User Equipment (UE) including an MTC terminal, communication patterns (CP) regarding the UE.

The communication patterns are defined to be CP parameters in Non-Patent Literature 1. Periodic communication indicator, Communication duration time, Periodic time, Scheduled communication time, and Stationary indication are defined as the CP parameters. Periodic communication indicator indicates whether the UE communicates periodically or only on demand. Communication duration time indicates duration interval time of periodic communication. Periodic time indicates interval time of periodic communication. Scheduled communication time indicates information regarding time when the UE is available for communication. Stationary indication indicates whether the UE performs stationary communication or mobile communication.

The SCS transmits a CP Parameter set in which at least one of Periodic communication indicator, Communication duration time, Periodic time, Scheduled communication time, and Stationary indication is configured to the SCEF via the T8 Reference Point. Next, the SCEF transmits the received CP Parameter set to a Home Subscriber Server (HSS) that manages subscriber information of the UE. The HSS manages the CP Parameter set as subscriber information of the UE. Further, the HSS transmits the CP Parameter set regarding the UE to a core network node such as a Mobile Management Entity (MME) or a Serving General Packet Radio Service Support Node (SGSN) that performs mobility management and the like of the UE.

The core network that has received the CP Parameter set communicates with the UE or executes call processing and the like for performing communication with the UE in accordance with CP Parameters included in the CP Parameter set.

CITATION LIST

Non-Patent Literature

[Non-Patent Literature 1] 3GPP TS23.682 V15.1.0 (2017 June)

SUMMARY OF INVENTION

Technical Problem

It is expected that the number of SCSs that provide services using MTC terminals will increase in the future. When, for example, a plurality of SCSs access one MTC terminal to perform communication, each of the SCSs communicates with the MTC terminal at a communication timing defined based on CP Parameters. In this case, if communication timings in the respective SCSs are different from one another, time during which the MTC terminal performs communication increases and time during which the MTC terminal that performs communication using a battery can perform communication will be reduced. Further, MTC terminals are often small-sized terminals such as sensor terminals and include batteries whose capacities are small as well. It is therefore required to perform communication so as not to reduce the battery capacities of the MTC terminals.

An object of the present disclosure is to provide a service control apparatus, a charging management server, a service control method, a charging information management method, and a program capable of reducing communication time of MTC terminals even when the number of SCSs increases.

Solution to Problem

A service control apparatus according to a first aspect of the present disclosure includes: a communication unit configured to receive a first communication pattern that defines a timing of communication between a first service providing apparatus and a communication terminal from the first service providing apparatus and a second communication pattern that defines a timing of communication between a second service providing apparatus and the communication terminal from the second service providing apparatus; and a controller configured to determine whether the first communication pattern and the second communication pattern indicate communication timings different from each other, in which when the first communication pattern and the second communication pattern indicate communication timings different from each other, the communication unit transmits a message to the second service providing apparatus requesting it to change its communication pattern to the first communication pattern.

A charging management server according to a second aspect of the present disclosure includes: a communication unit configured to receive, when a second service providing apparatus that has received, from a service control apparatus, a message for requesting the second service providing apparatus to change a communication pattern that defines a timing of communication with a communication terminal to a first communication pattern specified by a first service providing apparatus has changed its communication pattern to the first communication pattern, identification information of the second service providing apparatus from the service control apparatus; and a controller configured to change a charging rate of the second service providing apparatus specified using the identification information.

A service control method according to a third aspect of the present disclosure includes: receiving a first communication pattern that defines a timing of communication between a first service providing apparatus and a communication terminal from the first service providing apparatus and receiving a second communication pattern that defines a timing of communication between a second service providing apparatus and the communication terminal from the second service providing apparatus; and determining whether the first communication pattern and the second communication pattern indicate communication timings different from each other; and transmitting, when the first communication pattern and the second communication pattern indicate communication timings different from each other, a message to the second service providing apparatus requesting it to change its communication pattern to the first communication pattern.

A charging information management method according to a fourth aspect of the present disclosure includes: receiving, when a second service providing apparatus that has received, from a service control apparatus, a message for requesting the second service providing apparatus to change a communication pattern that defines a timing of communication with a communication terminal to a first communication pattern specified by a first service providing apparatus has changed its communication pattern to the first communication pattern, identification information of the second service providing apparatus from the service control apparatus; and changing a charging rate of the second service providing apparatus specified using the identification information.

A program according to a fifth aspect of the present disclosure causes a computer to perform the following processing of: receiving a first communication pattern that defines a timing of communication between a first service providing apparatus and a communication terminal from the first service providing apparatus and receiving a second communication pattern that defines a timing of communication between a second service providing apparatus and the communication terminal from the second service providing apparatus; and determining whether the first communication pattern and the second communication pattern indicate communication timings different from each other; and transmitting, when the first communication pattern and the second communication pattern indicate communication timings different from each other, a message to the second service providing apparatus requesting it to change its communication pattern to the first communication pattern.

Advantageous Effects of Invention

According to the present disclosure, it is possible to provide a service control apparatus, a charging management server, a service control method, a charging information management method, and a program capable of reducing communication time of MTC terminals even when the number of SCSs increases.

DESCRIPTION OF EMBODIMENTS

First Embodiment

Figure 1:
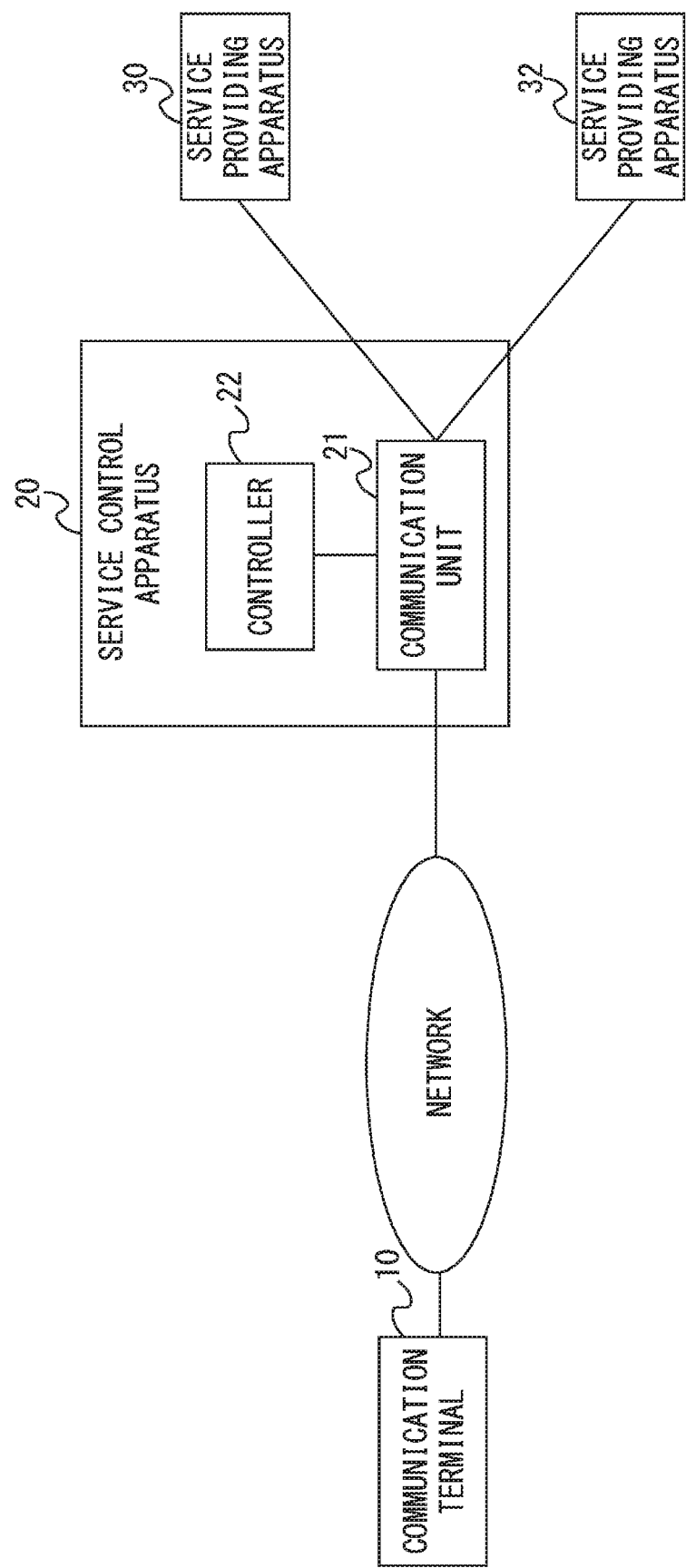
FIG. 1 is a configuration diagram of a communication system according to a first embodiment.

Hereinafter, with reference to the drawings, embodiments of the present disclosure will be explained. With reference to FIG. 1, a configuration example of a communication system according to a first embodiment of the present disclosure will be explained. The communication system shown in FIG. 1 includes a communication terminal 10, a service control apparatus 20, a service providing apparatus 30, and a service providing apparatus 32. Further, the communication terminal 10 performs communication with the service control apparatus 20 via a network. The network includes, for example, a radio network and a core network. It is assumed that the service control apparatus 20 is arranged in a core network. Further, the network that includes the radio network and the core network may be referred to as a mobile network.

Each of the communication terminal 10, the service control apparatus 20, the service providing apparatus 30, and the service providing apparatus 32 may be a computer apparatus that operates by a processor executing a program stored in a memory.

The communication terminal 10 may be a mobile telephone terminal or a smartphone terminal. Further, the communication terminal 10 may be an MTC terminal or a Machine to Machine (M2M) terminal.

Each of the service providing apparatus 30 and the service providing apparatus 32 is an apparatus configured to provide communication services for the communication terminal 10 or an apparatus configured to provide communication services that use the communication terminal 10. The communication services may also be referred to as, for example, application services or the like. Each of the service providing apparatus 30 and the service providing apparatus 32 may be a server apparatus that provides services.

The service control apparatus 20 is an apparatus that performs authentication processing and the like regarding the service providing apparatus 30 and the service providing apparatus 32. The service control apparatus 20 may be a server apparatus that performs control regarding services provided for the communication terminal 10 or services that use the communication terminal 10. The service control apparatus 20 is arranged between the communication terminal 10, and the service providing apparatus 30 and the service providing apparatus 32.

Next, a configuration example of the service control apparatus 20 will be explained. The service control apparatus 20 includes a communication unit 21 and a controller 22. Each of the communication unit 21 and the controller 22 may be software or a module whose processing is executed by a processor executing a program stored in a memory. Alternatively, each of the communication unit 21 and the controller 22 may be hardware such as a circuit or a chip.

The communication unit 21 receives information regarding communication patterns that define a timing of communication between the service providing apparatus 30 and the communication terminal 10 from the service providing apparatus 30. The communication unit 21 further receives information regarding communication patterns that define a timing of communication between the service providing apparatus 32 and the communication terminal 10 from the service providing apparatus 32. The information regarding the communication patterns is information for defining a communication timing such as temporal information or time information regarding the time when the service providing apparatus 30 or the service providing apparatus 32 performs communication with the communication terminal 10. The information regarding the communication patterns may be, for example, a CP Parameter set in which at least one of Communication duration time, Periodic time, and Scheduled communication time is configured.

Further, in the following description, the communication pattern that defines a timing of communication between the service providing apparatus 30 and the communication terminal 10 is referred to as a first communication pattern and the communication pattern that defines a timing of communication between the service providing apparatus 32 and the communication terminal 10 is referred to as a second communication pattern.

The controller 22 determines whether the first communication pattern and the second communication pattern indicate communication timings different from each other. That the communication timings are different from each other may indicate, for example, that the time when the service providing apparatus 30 communicates with the communication terminal 10 is different from the time when the service providing apparatus 32 communicates with the communication terminal 10.

Now, when the communication timing defined by the first communication pattern and the communication timing defined by the second communication pattern are executed within a predetermined period, it can be regarded that the communication timings are the same or coincide with each other. In other words, that the communication timings are different from each other may indicate that a period between these communication timings exceeds a predetermined period. That the communication timings are the same or coincide with each other may indicate that these timings are substantially the same or substantially coincide with each other, and may not necessarily indicate that they completely coincide with each other.

When the first communication pattern and the second communication pattern indicate communication timings different from each other in the controller 22, the communication unit 21 transmits, to the service providing apparatus 32, a message requesting the service providing apparatus 32 to change the second communication pattern to the first communication pattern. That is, the communication unit 21 requests the service providing apparatus 32 to perform communication at a timing the same as the timing when the service providing apparatus 30 performs communication when the service providing apparatus 32 performs communication with the communication terminal 10.

When the service providing apparatus 32 agrees to change its communication pattern, the communication pattern of the service providing apparatus 32 is changed to the first communication pattern.

As described above, the communication unit 21 is able to determine whether the timing when the service providing apparatus 30 communicates with the communication terminal 10 is different from the timing when the service providing apparatus 32 communicates with the communication terminal 10. When the communication timings are different from each other, the communication unit 21 is able to request the service providing apparatus 32 to change its communication pattern to the communication pattern of the service providing apparatus 30.

When the service providing apparatus 32 agrees to change its communication patterns, the service providing apparatus 30 and the service providing apparatus 32 communicate with the communication terminal 10 at the same communication timing.

As described above, since the service providing apparatus 30 and the service providing apparatus 32 communicate with the communication terminal 10 at the same timing, it is possible to reduce the communication time of the communication terminal 10 compared to a case in which they communicate with the communication terminal 10 at timings different from each other. It is therefore possible to save the capacity of the battery used by the communication terminal 10.

Second Embodiment

Figure 2:
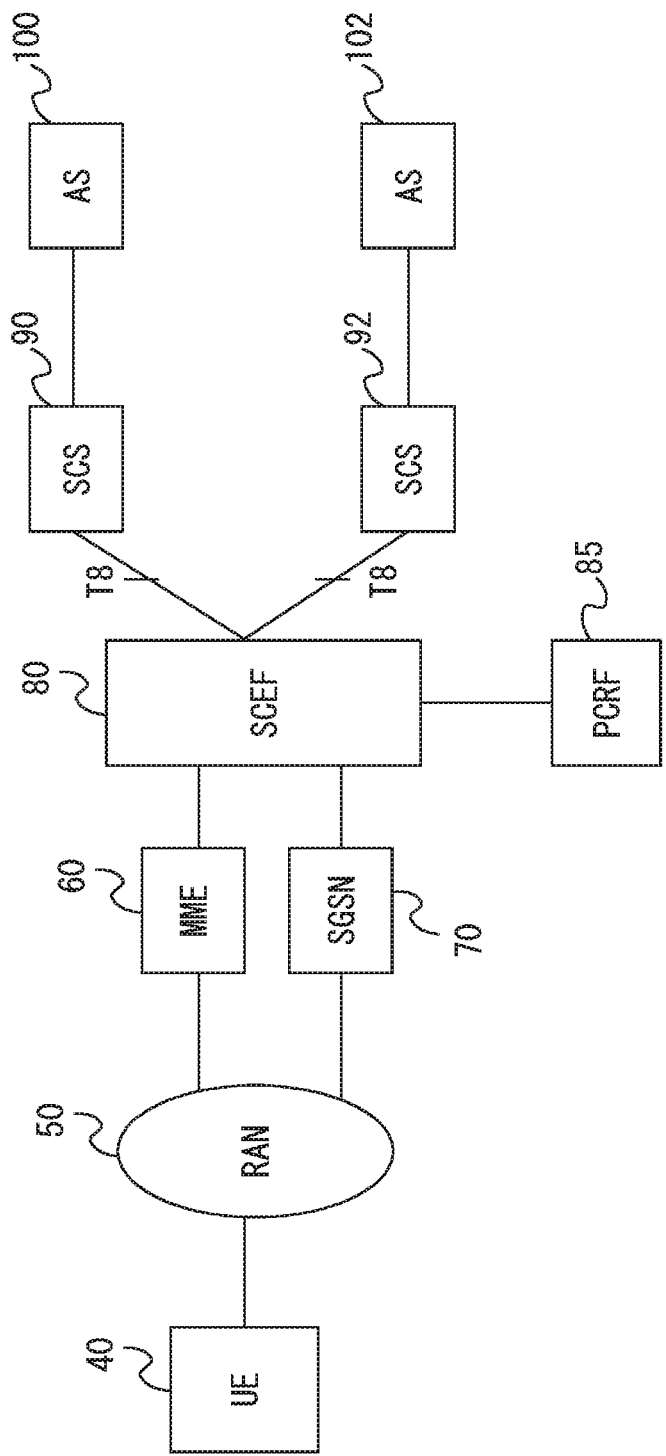
FIG. 2 is a configuration diagram of a communication system according to a second embodiment.

Referring next to FIG. 2, a configuration example of a communication system according to a second embodiment will be explained. The communication system shown in FIG. 2 is composed of a node apparatus whose standards or specification are defined by the 3GPP. The communication system shown in FIG. 2 includes a UE 40, a Radio Access Network (RAN) 50, an MME 60, an SGSN 70, an SCEF 80, a PCRF 85, an SCS 90, an SCS 92, an AS 100, and an AS 102. A T8 Reference Point is defined between the SCEF 80 and the SCS 90 and between the SCEF 80 and the SCS 92.

The UE 40 corresponds to the communication terminal 10 shown in FIG. 1. The SCEF 80 corresponds to the service control apparatus 20 shown in FIG. 1. That is, the SCEF 80 has a configuration similar to that of the service control apparatus 20. The SCS 90 and the AS 100 correspond to the service providing apparatus 30 shown in FIG. 1 and the SCS 92 and the AS 102 correspond to the service providing apparatus 32 shown in FIG. 1. In the following description, the SCS 90 and the AS 100, and the SCS 92 and the AS 102 may be described as SCS 90/AS 100 and SCS 92/AS 102 as apparatuses for providing services. Further, while a configuration in which each of the SCS 90 and the SCS 92 is connected to one AS is shown in FIG. 2, each of the SCSs may be connected to a plurality of ASs.

The RAN 50 may include a Radio Network Controller (RNC), a NodeB that supports so-called 2G (Generation) or 3G as a radio communication system, an evolved Node B (eNB) that supports Long Term Evolution (LTE) as a radio communication system and the like. The UE 40 performs radio communication with the Node B or the eNB. Each of the MME 60 and the SGSN 70 is a node apparatus that performs mobility management regarding the UE 40.

The PCRF 85 performs policy control in the mobile network. Further, the PCRF 85 performs charging control regarding the UE 40, the SCS 90/AS 100, and the SCS 92/AS 102. The charging control includes, for example, change in a charging rate, generation of charging information and the like.

Figure 3:
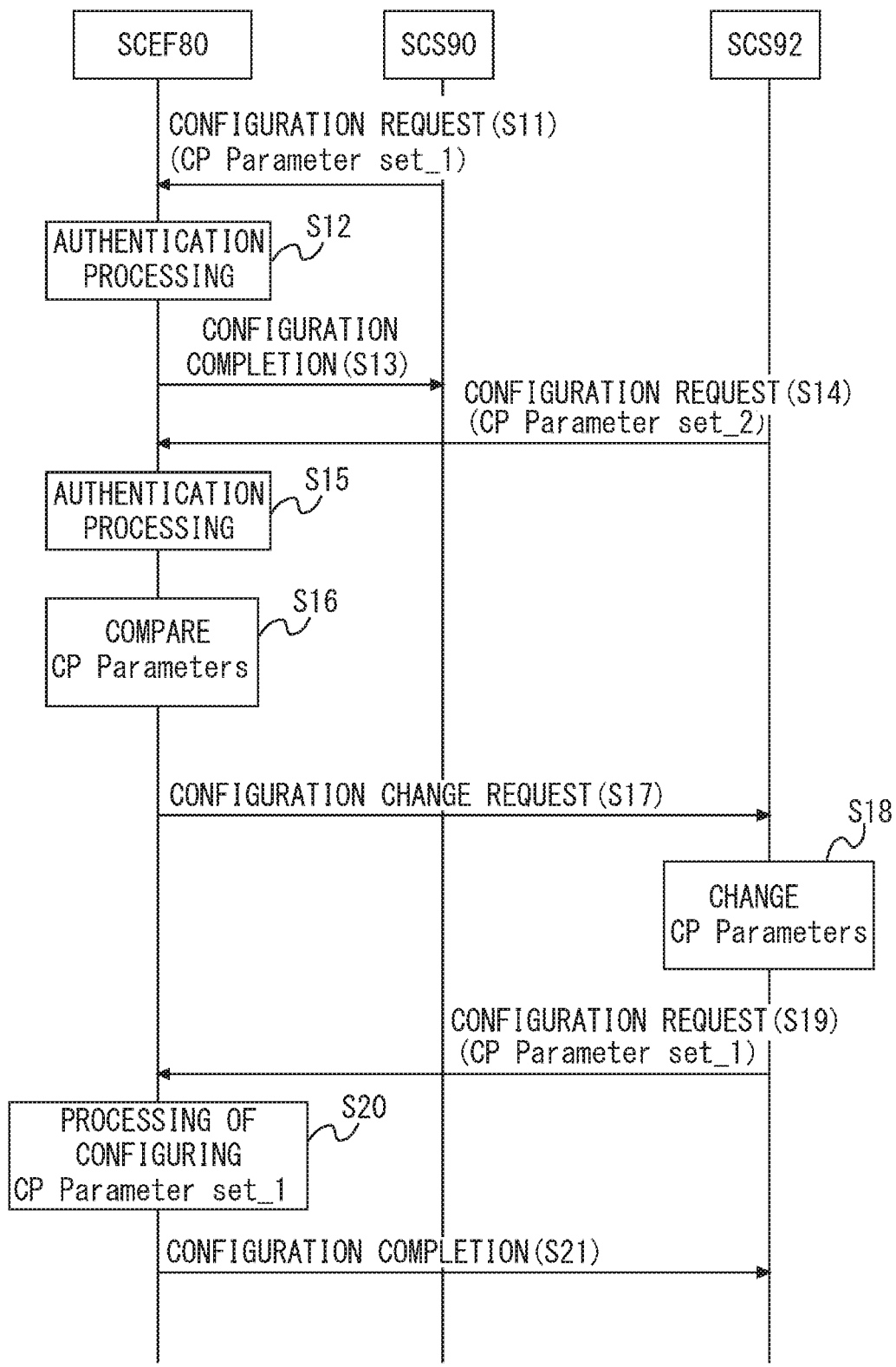
FIG. 3 is a diagram showing a flow of CP Parameter change processing according to the second embodiment.

Referring next to FIG. 3, a flow of CP Parameter change processing according to the second embodiment will be explained. First, the SCS 90 transmits a configuration request message including CP Parameter set_1 to the SCEF 80 (S11). The CP Parameter set_1 is information indicating the communication timing when the SCS 90 communicates with the UE 40. Next, the SCEF 80 determines whether the SCS 90 is able to request configuration of the CP Parameter set (S12). That is, the SCEF 80 performs authentication processing regarding the SCS 90. The SCEF 80 may hold, for example, list information of SCSs capable of requesting configuration of the CP Parameter set. The SCEF 80 may determine that the SCS 90 is able to request configuration of the CP Parameter set when the identification information indicating the SCS that has transmitted the configuration request message, the identification information being configured in the configuration request message, is configured in the list information. Further, when it has been determined that the SCS 90 is able to request configuration of the CP Parameter set, the SCEF 80 performs processing of configuring the CP Parameter set_1 regarding the SCS 90. The processing of configuring the CP Parameter set_1 may be, for example, processing of transmitting the CP Parameter set_1 to the HSS that manages subscriber information of the UE 40. Further, upon receiving the CP Parameter set_1, the HSS transmits the CP Parameter set_1 to the MME or the SGSN that performs mobility management of the UE 40.

Next, upon completing the processing of configuring the CP Parameter set_1, the SCEF 80 transmits a configuration completion message to the SCS 90 (S13).

Next, the SCS 92 transmits a configuration request message including CP Parameter set_2 to the SCEF 80 (S14). The CP Parameter set_2 is information indicating the communication timing when the SCS 92 communicates with the UE 40. Next, the SCEF 80 determines whether the SCS 92 is able to request configuration of the CP Parameter set (S15). That is, the SCEF 80 performs authentication processing regarding the SCS 92.

When the SCEF 80 has determined that the SCS 92 is able to request configuration of the CP Parameter set, the SCEF 80 determines whether the communication timing indicated in the CP Parameter set_1 is different from the communication timing indicated in the CP Parameter set_2 (S16). The CP Parameter set_1 has already been configured as a CP Parameter set regarding the UE 40. The CP Parameter set_2 is transmitted from the SCS 92. That is, when the UE, which is a communication destination of the SCS 90, coincides with the UE, which is a communication destination of the SCS 92, the SCEF 80 may determine whether the communication timing of the SCS 90 and the communication timing of the SCS 92 are different from each other. A case in which communication timings are different from each other may be a case in which the difference between these communication timings exceeds a predetermined period. In this example, a description will be given based on the assumption that the SCEF 80 has determined in Step S16 that the communication timing indicated in the CP Parameter set_1 is different from the communication timing indicated in the CP Parameter set_2.

Next, the SCEF 80 transmits a configuration change request message to the SCS 92 (S17). The configuration change request message includes information for requesting the SCS 92 to change the CP Parameter set_2 to the CP Parameter set_1.

Next, upon receiving the configuration change request message, the SCS 92 determines whether to change the CP Parameter set_2 to the CP Parameter set_1 (S18). The SCS 92 may determine whether to change the CP Parameter set in accordance with the policy that the SCS 92 has such as whether the services to be provided will not be affected by the change of the CP Parameter set. In this example, a description will be given based on the assumption that the SCS 92 has determined in Step S18 that it should change the CP Parameter set_2 to the CP Parameter set_1.

Next, the SCS 92 transmits a configuration request message including the CP Parameter set_1 to the SCEF 80 (S19). Next, the SCEF 80 performs processing of configuring the CP Parameter set_1 regarding the SCS 92 (S20). Next, upon completion of the processing of configuring the CP Parameter set_1 regarding the SCS 92, the SCEF 80 transmits a configuration completion message to the SCS 92 (S21).

Figure 4:
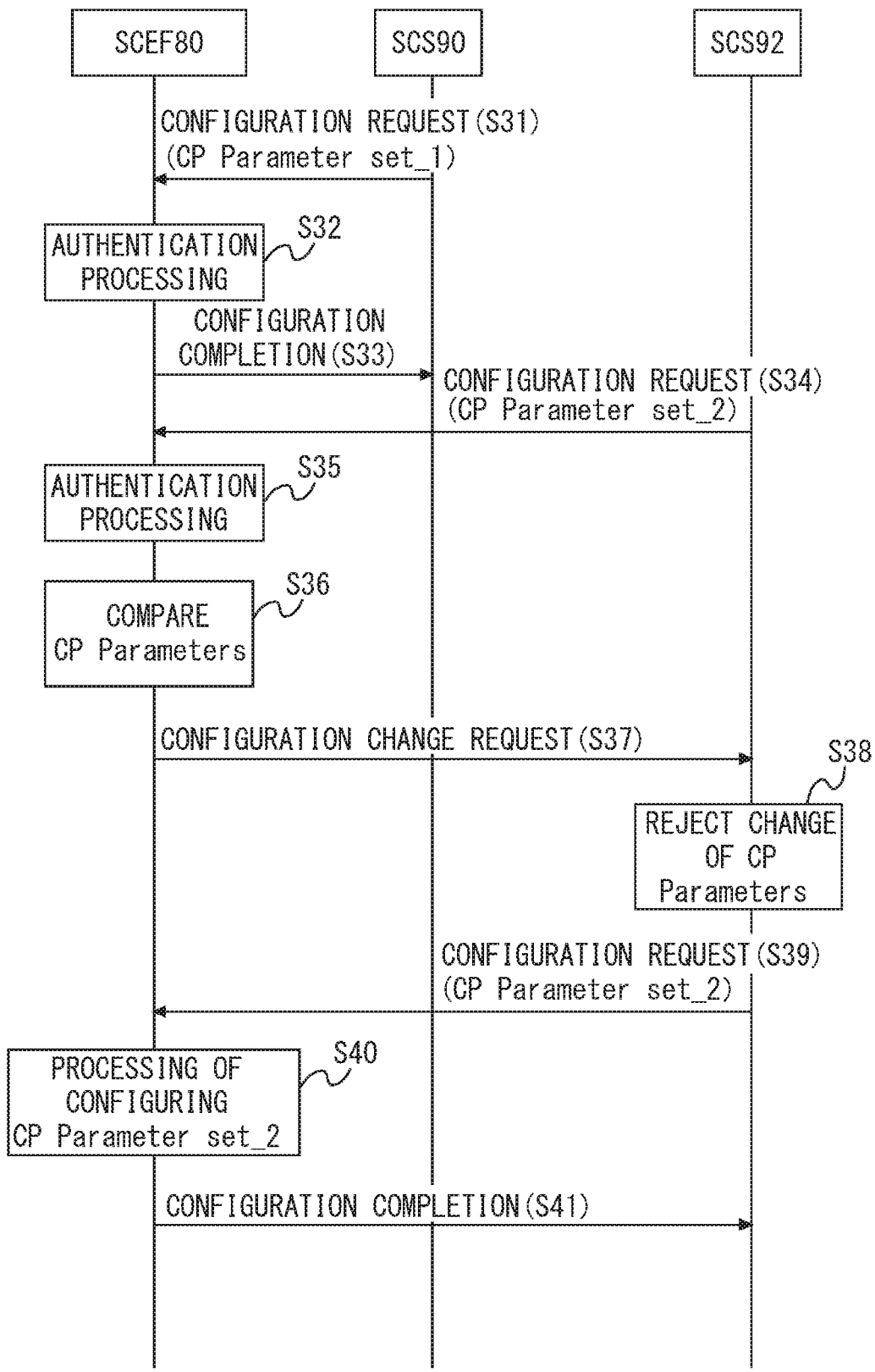
FIG. 4 is a diagram showing a flow of CP Parameter change processing according to the second embodiment.

With reference next to FIG. 4, a flow of the CP Parameter change processing according to the second embodiment, which is different from that shown in FIG. 3, will be explained. While the flow of the processing of the case in which the SCS 92 has determined that it will change its CP Parameter set has been described in FIG. 3, a flow of processing of a case in which the SCS 92 determines that it will not change its CP Parameter set will be explained in FIG. 4.

Since Steps S31-S37 are similar to Steps S11-S17 in FIG. 3, the detailed descriptions thereof will be omitted. Next, it is assumed that the SCS 92 has determined that it will not change the CP Parameter set_2 to the CP Parameter set_1 (S38). In this case, the SCS 92 transmits the configuration request message including the CP Parameter set_2 transmitted in Step S34 to the SCEF 80 (S39). That is, the SCS 92 re-transmits the configuration request message transmitted in Step S34.

Next, the SCEF 80 performs processing of configuring the CP Parameter set_2 regarding the SCS 92 (S40). Next, upon completion of the processing of configuring the CP Parameter set_2 regarding the SCS 92, the SCEF 80 transmits a configuration completion message to the SCS 92 (S41).

As described above, the SCEF 80 according to the second embodiment is able to determine whether the communication timing indicated in the CP Parameter set_1 transmitted from the SCS 90 is different from the communication timing indicated in the CP Parameter set_2 transmitted from the SCS 92. When the communication timings are different from each other, the SCEF 80 is able to transmit a message for requesting the SCS 92 to change the communication timing to the SCS 92. Specifically, the SCS 90 is able to request the SCS 92 to change its CP Parameter set to the CP Parameter set_1 used by the SCS 90.

When the SCS 92 has determined that it will change its parameter set to the CP Parameter set_1, the communication timing when the SCS 90 communicates with the UE 40 coincides with the communication timing when the SCS 92 communicates with the UE 40. As a result, it is possible to reduce the time during which the UE 40 performs communication. In other words, it is possible to reduce the time during which the UE 40 is connected to the radio network. During a period in which the UE 40 does not perform communication, the UE 40 may be operated in a Power Saving Mode (PSM) in which power consumption is reduced or communication intervals in Discontinuous Reception (DRX) may be increased. As a result, it is possible to save the capacity of the battery used by the UE 40.

Further, when the SCS 92 has determined that it will not change its parameter set to the CP Parameter set_1, the SCEF 80 may transmit a message for requesting the SCS 90 in which the CP Parameter set_1 has already been configured to change the CP Parameter set_1 to the CP Parameter set_2.

Third Embodiment

Figure 5:
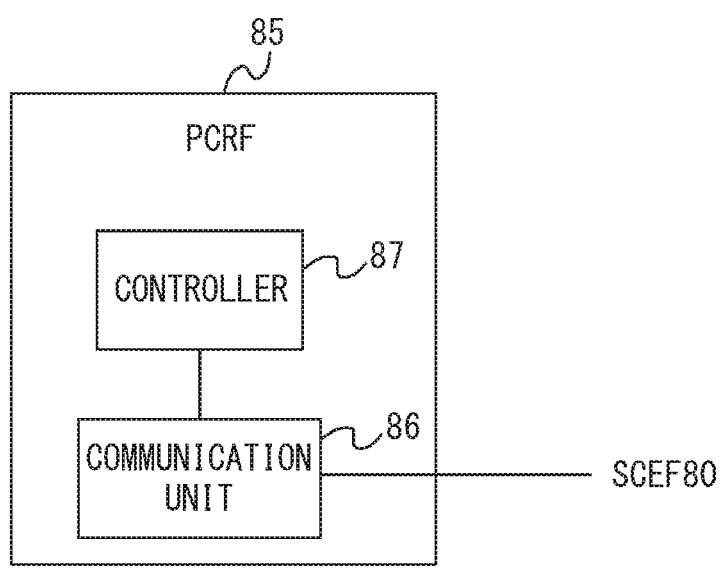
FIG. 5 is a configuration diagram of PCRF according to a third embodiment.

With reference next to FIG. 5, a configuration example of the PCRF 85 according to a third embodiment will be explained. The PCRF 85 includes a communication unit 86 and a controller 87. Each of the communication unit 86 and the controller 87 may be software or a module whose processing is executed by a processor executing a program stored in a memory. Alternatively, each of the communication unit 86 and the controller 87 may be hardware such as a circuit or a chip.

When the SCS 90 or the SCS 92 has changed the values of the CP Parameters in accordance with the communication timings of other SCSs, the communication unit 86 receives, from the SCEF 80, identification information of the SCS whose values of the CP Parameters have been changed.

The controller 87 changes the charging rate applied to the SCS specified by the identification information received by the communication unit 86. The SCS whose values of the CP Parameters have been changed determines to change the values of the CP Parameters based on the configuration change request message from the SCEF 80. In other words, the SCS whose values of the CP Parameters have been changed changes the values of the CP Parameters in accordance with a request for changing the values of the CP Parameters transmitted from the communication carrier. Therefore, the communication carrier may change the charging rate of the SCS whose values of the CP Parameters have been changed so as to lower this rate. As described above, by performing processing of lowering the charging rate of the SCS whose values of the CP Parameters have been changed, it is possible to motivate the SCS to change the values of the CP Parameters in response to the request from the communication carrier.

Figure 6:
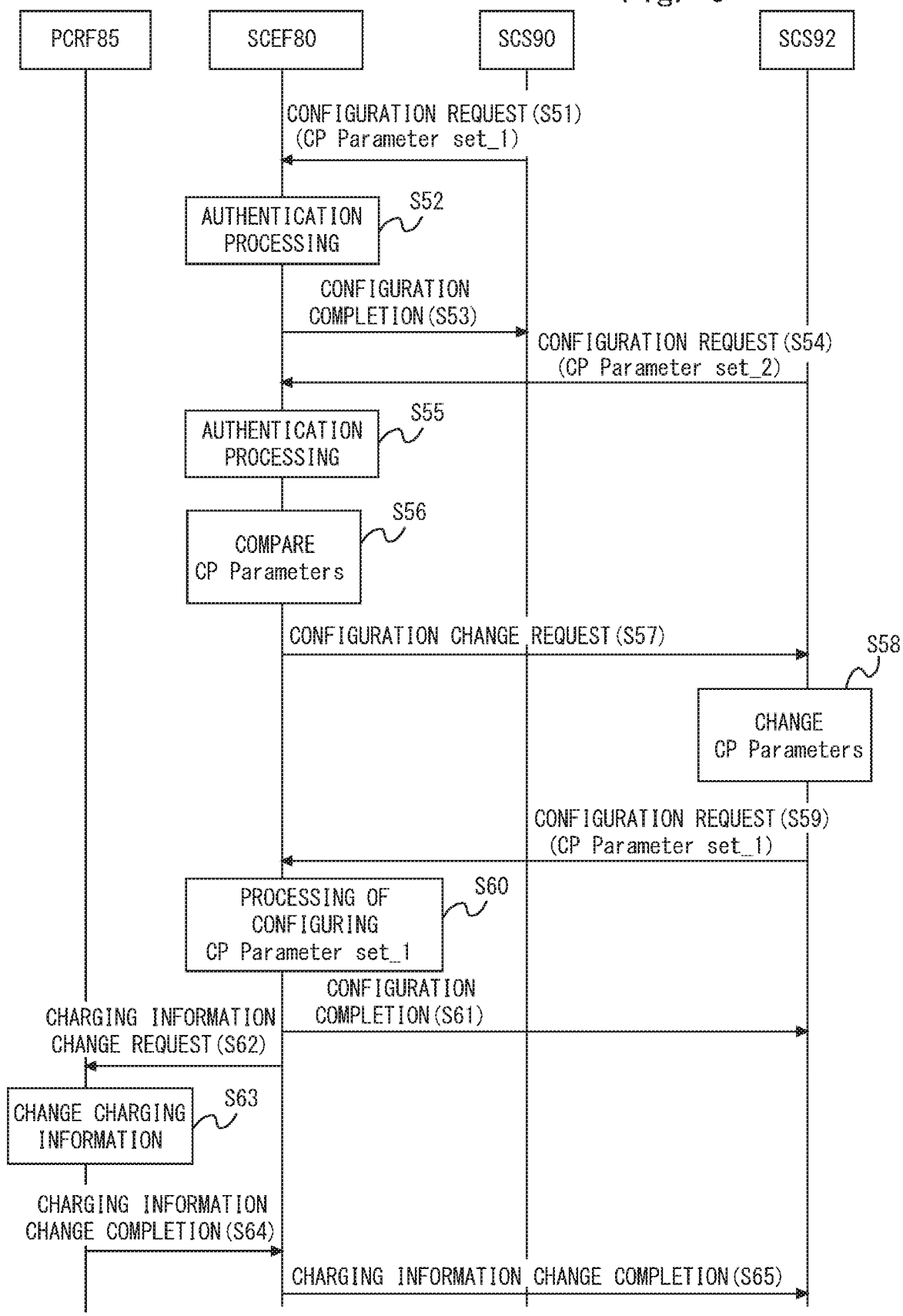
FIG. 6 is a diagram showing a flow of CP Parameter change processing according to the third embodiment.

Referring next to FIG. 6, a flow of CP Parameter change processing according to the third embodiment will be explained. Since Steps S51-S61 are similar to Steps S11-S21 shown in FIG. 3, detailed descriptions thereof will be omitted.

After the processing of configuring the CP Parameter set_1 regarding the SCS 92 is completed, the SCEF 80 transmits a charging information change request message to the PCRF 85 (S62). The charging information change request message includes identification information of the SCS 92 whose CP Parameter set has been changed in response to the request from the SCEF 80. The identification information of the SCS 92 may be, for example, an IP address allocated to the SCS 92 or information that is able to uniquely identify the SCS 92 in the mobile network.

Next, the PCRF 85 changes the charging information of the SCS 92 specified by the identification information received in Step S62 (S63). Specifically, the PCRF 85 changes the charging rate of the Step SSCS 92 to lower this rate.

Next, when the change in the charging information is completed, the PCRF 85 transmits a charging information change completion message to the SCEF 80 as a response to the message received in Step S62 (S64). Further, upon receiving the charging information change completion message in Step S64, the SCEF 80 transmits the charging information change completion message to the SCS 92 (S65).

As described above, the PCRF 85 is able to lower the charging rate of the SCS whose CP Parameters have been changed in response to the request from the SCEF 80. Accordingly, it will be expected that the number of SCSs that will change the CP Parameters in response to the request for changing the CP Parameters transmitted from the SCEF 80 will increase.

Next, in the following description, with reference to FIG. 7, a configuration example of the SCEF 80 and the PCRF 85 described in the aforementioned plurality of embodiments will be explained.

Figure 7:
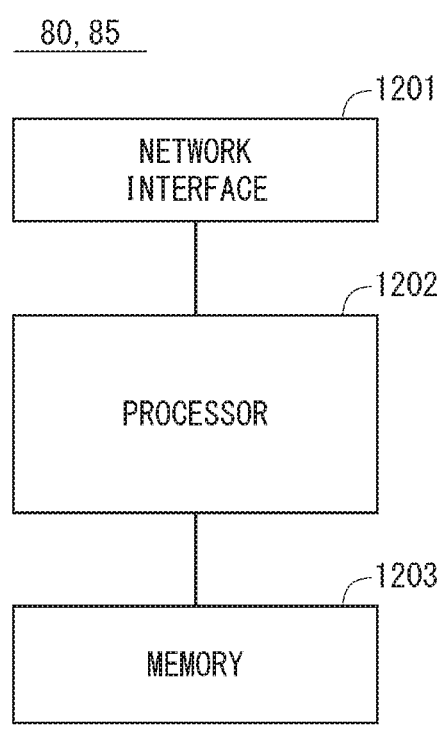
FIG. 7 is a configuration diagram of SCEF and PCRF according to each of the embodiments.

FIG. 7 is a block diagram showing a configuration example of the SCEF 80 and the PCRF 85. Referring to FIG. 7, the SCEF 80 and the PCRF 85 each include a network interface 1201, a processor 1202, and a memory 1203. The network interface 1201 is used to communicate with another network node apparatus that composes a communication system. The network interface 1201 may include, for example, a network interface card (NIC) conforming to the IEEE 802.3 series.

The processor 1202 loads software (computer programs) from the memory 1203 and executes the loaded software (computer programs) to perform processing of the SCEF 80 and the PCRF 85 described with reference to the sequence diagrams and the flowcharts in the above embodiments. The processor 1202 may be, for example, a microprocessor, a Micro Processing Unit (MPU), or a Central Processing Unit (CPU). The processor 1202 may include a plurality of processors.

The memory 1203 is composed of a combination of a volatile memory and a non-volatile memory. The memory 1203 may include a storage located apart from the processor 1202. In this case, the processor 1202 may access the memory 1203 via an I/O interface (not shown).

In the example shown in FIG. 7, the memory 1203 is used to store software modules. The processor 1202 may load these software modules from the memory 1203 and execute the loaded software modules, thereby performing the processing of the SCEF 80 and the PCRF 85 described in the above embodiments.

As described with reference to FIG. 7, each of the processors included in the SCEF 80 and the PCRF 85 executes one or more programs including instructions to cause a computer to perform an algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media, optical magnetic storage media (e.g., magneto-optical disks), CD-Read Only Memory (CD-ROM), CD-R, CD-R/W, and semiconductor memories. The storage media include, for example, flexible disks, magnetic tapes, and hard disk drives. The semiconductor memories include, for example, mask ROM, Programmable ROM (PROM), Erasable PROM (EPROM), flash ROM, and Random Access Memory (RAM). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the aforementioned embodiments and may be changed as appropriate without departing from the spirit of the present disclosure. Further, the present disclosure may be executed by combining the embodiments as appropriate.

While the present disclosure has been described with reference to the embodiments, the present disclosure is not limited to the aforementioned embodiments. Various changes that can be understood by those skilled in the art can be made to the configurations and the details of the present disclosure within the scope of the present disclosure.

This application is based upon and claims the benefit of priority from Japanese Patent Application No. 2017-181505, filed on Sep. 21, 2017, the disclosure of which is incorporated herein in its entirety by reference.

A part or all of the aforementioned embodiments may be described as shown in the following Supplementary Notes. However, they are not limited thereto.

(Supplementary Note 1)

A service control apparatus comprising:

a communication unit configured to receive a first communication pattern that defines a timing of communication between a first service providing apparatus and a communication terminal from the first service providing apparatus and a second communication pattern that defines a timing of communication between a second service providing apparatus and the communication terminal from the second service providing apparatus; and a controller configured to determine whether the first communication pattern and the second communication pattern indicate communication timings different from each other, wherein when the first communication pattern and the second communication pattern indicate communication timings different from each other, the communication unit transmits a message to the second service providing apparatus requesting it to change its communication pattern to the first communication pattern.

(Supplementary Note 2)

The service control apparatus according to Supplementary Note 1, wherein at least one of duration time of periodic communication with the communication terminal, a time interval of the periodic communication, and time when communication with the communication terminal is available is used in the first and second communication patterns.

(Supplementary Note 3)

The service control apparatus according to Supplementary Note 1 or 2, wherein, when the second service providing apparatus has changed its communication pattern to the first communication pattern, the communication unit transmits, to a charging management server that manages charging rates regarding a plurality of service providing apparatuses, identification information of the second service providing apparatus whose communication pattern has been changed.

(Supplementary Note 4)

The service control apparatus according to Supplementary Note 1 or 2, wherein, when a change to the first communication pattern is not performed in the second service providing apparatus, the communication unit transmits, to the first service providing apparatus, a message requesting the first service providing apparatus to change its communication pattern to the second communication pattern.

(Supplementary Note 5)

A charging management server comprising:

a communication unit configured to receive, when a second service providing apparatus that has received, from a service control apparatus, a message for requesting the second service providing apparatus to change a communication pattern that defines a timing of communication with a communication terminal to a first communication pattern specified by a first service providing apparatus has changed its communication pattern to the first communication pattern, identification information of the second service providing apparatus from the service control apparatus; and a controller configured to change a charging rate of the second service providing apparatus specified using the identification information.

(Supplementary Note 6)

A service control method comprising:

receiving a first communication pattern that defines a timing of communication between a first service providing apparatus and a communication terminal from the first service providing apparatus and receiving a second communication pattern that defines a timing of communication between a second service providing apparatus and the communication terminal from the second service providing apparatus; and determining whether the first communication pattern and the second communication pattern indicate communication timings different from each other; and transmitting, when the first communication pattern and the second communication pattern indicate communication timings different from each other, a message to the second service providing apparatus requesting it to change its communication pattern to the first communication pattern.

(Supplementary Note 7)

A charging information management method comprising:

receiving, when a second service providing apparatus that has received, from a service control apparatus, a message for requesting the second service providing apparatus to change a communication pattern that defines a timing of communication with a communication terminal to a first communication pattern specified by a first service providing apparatus has changed its communication pattern to the first communication pattern, identification information of the second service providing apparatus from the service control apparatus; and changing a charging rate of the second service providing apparatus specified using the identification information.

(Supplementary Note 8)

A program for causing a computer to perform the following processing of:

receiving a first communication pattern that defines a timing of communication between a first service providing apparatus and a communication terminal from the first service providing apparatus and receiving a second communication pattern that defines a timing of communication between a second service providing apparatus and the communication terminal from the second service providing apparatus; and determining whether the first communication pattern and the second communication pattern indicate communication timings different from each other; and transmitting, when the first communication pattern and the second communication pattern indicate communication timings different from each other, a message to the second service providing apparatus requesting it to change its communication pattern to the first communication pattern.

(Supplementary Note 9)

A program for causing a computer to perform the following processing of:

receiving, when a second service providing apparatus that has received, from a service control apparatus, a message for requesting the second service providing apparatus to change a communication pattern that defines a timing of communication with a communication terminal to a first communication pattern specified by a first service providing apparatus has changed its communication pattern to the first communication pattern, identification information of the second service providing apparatus from the service control apparatus; and change a charging rate of the second service providing apparatus specified using the identification information.

REFERENCE SIGNS LIST

10 Communication Terminal
20 Service Control Apparatus
21 Communication Unit
22 Controller
30 Service Providing Apparatus
32 Service Providing Apparatus
40 UE
50 RAN
60 MME
70 SGSN
80 SCEF
85 PCRF
86 Communication Unit
87 Controller
90 SCS
92 SCS
100 AS
102 AS

What is claimed is:

1. A Service Capability Exposure Function (SCEF) comprising:
   at least one memory storing instructions, and
   at least one processor configured to execute the instructions to:
      receive a first communication pattern that defines a timing of communication between a first Service Capability Server (SCS) and a communication terminal from the first SCS and receiving a second communication pattern that defines a timing of communication between a second SCS and the communication terminal from the second SCS;
      determine whether the first communication pattern and the second communication pattern indicate communication timings different from each other; and
      transmit, when the first communication pattern and the second communication pattern indicate communication timings different from each other, a message to the second SCS requesting it to change its communication pattern to the first communication pattern.

2. The SCEF according to claim 1, wherein at least one of duration time of periodic communication with the communication terminal, a time interval of the periodic communication, and time when communication with the communication terminal is available is used in the first and second communication patterns.

3. The SCEF according to claim 1, wherein the at least one processor is further configured to execute the instructions to, when the second SCS has changed its communication pattern to the first communication pattern, transmit, to a charging management server that manages charging rates regarding a plurality of SCSs, identification information of the second SCS whose communication pattern has been changed.

4. The SCEF according to claim 1, wherein the at least one processor is further configured to execute the instructions to, when a change to the first communication pattern is not performed in the second SCS, transmit, to the first SCS, a message requesting the first SCS to change its communication pattern to the second communication pattern.

5. A charging management server comprising:
   at least one memory storing instructions, and
   at least one processor configured to execute the instructions to:
      receive, when a second Service Capability Server (SCS) that has received, from a Service Capability Exposure Function (SCEF), a message for requesting the second SCS to change a communication pattern that defines a timing of communication with a communication terminal to a first communication pattern specified by a first SCS has changed its communication pattern to the first communication pattern, identification information of the second SCS from the SCEF; and
      change a charging rate of the second SCS specified using the identification information.

6. A service control method comprising:
   receiving a first communication pattern that defines a timing of communication between a first Service Capability Server (SCS) and a communication terminal from the first SCS and receiving a second communication pattern that defines a timing of communication between a second SCS and the communication terminal from the second SCS; and
   determining whether the first communication pattern and the second communication pattern indicate communication timings different from each other; and
   transmitting, when the first communication pattern and the second communication pattern indicate communication timings different from each other, a message to the second SCS requesting it to change its communication pattern to the first communication pattern.

* * * * *